(12) United States Patent
Lu et al.

(10) Patent No.: US 10,345,167 B2
(45) Date of Patent: Jul. 9, 2019

(54) TEMPERATURE COMPENSATED TORQUE SENSOR

(71) Applicant: General Electric Company, Schenectady, NY (US)

(72) Inventors: Dan Tho Lu, Minden, NV (US); Pekka Tapani Sipila, Garching Bei Munchen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/648,422

(22) Filed: Jul. 12, 2017

(65) Prior Publication Data

US 2019/0017888 A1    Jan. 17, 2019

(51) Int. Cl.
*G01L 3/10* (2006.01)
*G01L 5/22* (2006.01)
*G01L 25/00* (2006.01)

(52) U.S. Cl.
CPC .............. *G01L 3/105* (2013.01); *G01L 3/102* (2013.01); *G01L 5/228* (2013.01); *G01L 25/003* (2013.01); *G01L 5/221* (2013.01)

(58) Field of Classification Search
CPC . G01L 1/12; G01L 1/122; G01L 1/125; G01L 3/10; G01L 3/105; G01L 5/228; G01L 25/003; G01L 5/221; G01L 1/127; G01N 27/72
USPC ...................................... 73/862.331–862.338
See application file for complete search history.

(56) References Cited

U.S. PATENT DOCUMENTS

| | | |
|---|---|---|
| 3,465,581 A | 9/1969 | Hohenberg |
| 4,596,150 A | 6/1986 | Kuhr |
| 4,817,444 A * | 4/1989 | Yagi .................. G01L 3/102 73/862.335 |
| 4,829,834 A | 5/1989 | Masom |
| 4,899,598 A | 2/1990 | Gumaste et al. |
| 4,939,937 A | 7/1990 | Klauber et al. |
| 5,182,953 A | 2/1993 | Ellinger et al. |
| 5,307,690 A | 5/1994 | Hanazawa |
| 5,323,659 A | 6/1994 | Wakamiya et al. |

(Continued)

OTHER PUBLICATIONS

U.S. Appl. No. 15/483,781, General Electric Corporation.

*Primary Examiner* — Jonathan M Dunlap
*Assistant Examiner* — Octavia Hollington
(74) *Attorney, Agent, or Firm* — Mintz Levin Cohn Ferris Glovsky and Popeo, P.C.

(57) ABSTRACT

A temperature compensated torque sensing system and methods for using the same are provided. The system can include a sensor head in electrical communication with a controller. The sensor head can contain a torque sensor including a core, a driving coil and a sensing coil. The sensor head can also include a temperature sensor coupled to the sensor head. The torque sensor can be configured to measure torque applied to a selected portion of a target based upon magnetic flux passing through the target, while the temperature sensor can be configured to concurrently measure the target temperature. The temperature sensor can be positioned for avoiding interference with sensed magnetic flux. The controller can adjust the determined torque using the temperature measurements to compensate for changes in magnetic properties of the target due to variation in target temperature. In this manner, the accuracy of the torque measurements can be increased.

20 Claims, 8 Drawing Sheets

(56) References Cited

U.S. PATENT DOCUMENTS

| | | | |
|---|---|---|---|
| 5,515,736 | A | 5/1996 | Kawagoe et al. |
| 5,708,216 | A | 1/1998 | Garshelis et al. |
| 5,887,335 | A | 3/1999 | Garshelis |
| 6,490,934 | B2 | 12/2002 | Garshelis |
| 6,591,699 | B2 | 7/2003 | Ueno |
| 6,957,589 | B2 | 10/2005 | Ueno et al. |
| 7,454,978 | B2 | 11/2008 | Schroeder et al. |
| 7,533,584 | B1 | 5/2009 | Wahl |
| 7,821,321 | B2 | 10/2010 | Zimlich |
| 8,215,898 | B2 | 7/2012 | Nakazeki et al. |
| 8,692,545 | B2 | 4/2014 | Shimada et al. |
| 9,212,958 | B2 * | 12/2015 | Campbell ............... G01L 1/122 |
| 9,429,488 | B2 * | 8/2016 | Lu ........................... G01L 1/125 |
| 9,476,691 | B2 * | 10/2016 | May ........................ G01D 5/145 |
| 9,618,408 | B2 | 4/2017 | Lu et al. |
| 10,184,846 | B2 * | 1/2019 | Lu ........................... G01L 3/102 |
| 2006/0225521 | A1 | 10/2006 | Von Beck et al. |
| 2012/0025528 | A1 | 2/2012 | Sipila et al. |
| 2012/0212169 | A1 | 8/2012 | Wu et al. |
| 2013/0263654 | A1 | 10/2013 | Pietron et al. |
| 2014/0184210 | A1 | 7/2014 | Campbell et al. |

\* cited by examiner

TEMPERATURE COMPENSATED TORQUE SENSOR

BACKGROUND

Sensors can be used in a variety of industries to monitor equipment. As an example, torque sensors can be used to monitor rotating machine components (e.g., shafts) and output signals representative of torque applied to the monitored components. By comparing measured torques to design specifications, it can be determined whether monitored components are operating within these specifications.

Magnetostrictive torque sensors are a type of sensor that employs magnetic fields for measuring torque. In general, magnetostriction is a property of ferromagnetic materials that characterizes changes in shape (e.g., expansion or contraction) of the material in the presence of a magnetic field. Conversely, magnetic properties of a ferromagnetic material, such as permeability (the capability to support development of a magnetic field within the material) can change in response to torque applied to the material. A magnetostrictive torque sensor can generate magnetic flux that permeates a shaft and it can sense the magnetic flux as it interacts with the shaft. As an amount of torque applied to the shaft changes, a magnetostrictive sensor can output signals representative of torques applied to the shaft based upon the sensed magnetic flux.

However, magnetic properties of materials can also change due to variations in their temperature. These magnetic property changes can cause variations in the magnetic flux sensed by a magnetostrictive torque sensor that are independent of applied torque. Consequently, torque measurements acquired by magnetostrictive torque sensors based upon sensed magnetic flux can deviate from actual torque on a shaft.

SUMMARY

In general, systems and methods are provided for temperature compensation of magnetostrictive sensors, such as torque sensors.

In one embodiment, a magnetostrictive sensor is provided and can include a sensor head including a driving pole and a sensing pole. The driving pole can have a driving coil coupled thereto that can be configured to generate a first magnetic flux for impinging a target in response to receipt of a driving current. The sensing pole can have a sensing coil coupled thereto. The sensing pole can be configured to output a first signal (e.g., a force signal) based at least upon a second magnetic flux resulting from interaction of the first magnetic flux with a target and output a second signal (e.g., a temperature signal) based upon heat received from a target. The first signal does not interfere with the second signal.

In one embodiment, the sensing coil can be positioned at about a free end of the sensing pole.

In another embodiment, the sensor can include a controller in electrical communication with the sensor head. The controller can be configured to transmit the driving current to the driving coil, receive the first and second signals, determine a force applied to the target based upon the first signal, determine a temperature of the target based upon the second signal, and adjust the force determined from the first signal based upon the temperature determined from the second signal.

In another embodiment, the force can be a torque.

In another embodiment, the sensing coil can be in electrical communication with a first circuit configured to receive the first signal and a second circuit configured to receive the second signal.

The first and second signals can have a variety of configurations. In certain embodiments, the first signal can be a first alternating current and the second signal can be a second alternating current having a frequency less than the first signal, where the second alternating current can be substantially independent of an inductance of the sensing coil. In another embodiment, the first signal can be a first alternating current and the second signal can be a direct current.

In other aspects, a magnetostrictive sensor can be provided and can include a sensor head extending between a proximal end and a distal end. The sensor head can contain a driving pole, a sensing pole, and a temperature sensor. The driving pole can have a driving coil coupled thereto that can be configured to generate a first magnetic flux extending through the distal end of the sensor head for impinging a target in response to receipt of a driving current. The sensing pole can have a sensing coil coupled thereto and it can be configured to output a first signal based at least upon a second magnetic flux resulting from interaction of the first magnetic flux with a target. The temperature sensor can include a continuous length of electrically conductive wire that forms an open-sided shape extending within a plane defined by the distal end of the sensor head. The temperature sensor can be secured to the distal end of the sensor head and it can be configured to output a second signal based upon heat received from a target.

The temperature sensor can have a variety of configurations. In certain embodiments, the temperature sensor can be configured to avoid magnetically interfering with each of the driving coil and the sensing coil. In embodiments including more than one sensing coil, the temperature sensor can be configured to avoid magnetically interfering with each of the driving coil and all sensing coils. In other embodiments, the open-sided shape does not overlie either of the driving pole and the sensing pole along a longitudinal axis of the sensor head. In additional embodiments, the open-sided shape can be positioned on an inner face of the distal end of the sensor head. In another embodiment, the open-sided shape can be positioned on an outer face of the distal end of the sensor head.

In another embodiment, the distal end of the sensor head can be laminated and the open-sided shape can be positioned between layers of the laminated distal end of the sensor head.

In another embodiment, the sensor can include a controller in electrical communication with the sensor head. The controller can be configured to transmit the driving current to the driving coil, receive the first and second signals, determine a force applied to the target based upon the first signal, determine a temperature of the target based upon the second signal, and adjust the force determined from the first signal based upon the temperature determined from the second signal.

In another embodiment, the force can be a torque.

Methods for compensating a measurement of force applied to a target to account for target temperature are also provided. In one embodiment, the method can include generating a first magnetic flux with a driving coil coupled to a driving pole of a magnetostrictive sensor, directing the first magnetic flux through a ferromagnetic target and a sensing pole of the magnetostrictive torque sensor, detecting, by a sensing coil coupled to a sensing pole of the magnetostrictive sensor, a second magnetic flux resulting from interaction of the first magnetic flux with a target, outputting, by the sensing coil, a first signal based at least upon a second magnetic flux resulting from interaction of the first magnetic flux with a target, and outputting, by the sensing coil, a second signal based upon heat received from the target.

In one embodiment, the method can also include determining a force applied to the target based upon the first signal, determining a temperature of the target based upon the second signal, and adjusting the force determined from the first signal based upon the temperature determined from the second signal.

In other aspects, the temperature sensor can be distanced from the target.

In another embodiment, the target can be rotating and the first signal can represent a torque applied to the target.

In another embodiment, the torque represented by the first signal and the temperature represented by the second signal can be detected approximately concurrently and at about a same region of the target.

In another embodiment, the sensing coil can be positioned at about a free end of the sensing pole.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure. Those skilled in the art will understand that the systems, devices, and methods specifically described herein and illustrated in the accompanying drawings are non-limiting exemplary embodiments and that the scope of the present invention is defined solely by the claims.

DETAILED DESCRIPTION

Certain exemplary embodiments will now be described to provide an overview of the principles of the structure, function, manufacture, and use of the systems, devices, and methods disclosed herein. One or more examples of these embodiments are illustrated in the accompanying drawings. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Magnetostrictive sensors, such as torque sensors, can include a driving element that generates a magnetic flux and a sensing element that measures the magnetic flux as it interacts with a target (e.g., a rotating machine shaft). In some instances, where the temperature of the target can affect torque measurements based upon the sensed magnetic flux, temperature sensors can also be used to measure the target temperature and adjust the torque measurement to compensate for temperature. However, the position of the temperature sensor itself can also decrease accuracy of the torque measurement.

In one aspect, if a temperature sensor is placed too close to a sensing element, it can interfere with the magnetic flux sensed by the sensing element. In another aspect, if a temperature sensor is positioned remotely from a sensing element to avoid this interference, the temperature measured by the temperature sensor can differ from the actual temperature of the target because heat from the target can dissipate over the distance separating it from the temperature sensor. Accordingly, temperature compensated magnetostrictive torque sensors are provided that can integrate a temperature sensor positioned so as to avoid interference with magnetic flux used to measure torque of a target while also remaining sufficiently close to the target for accurately measuring its temperature.

Embodiments of sensing systems and corresponding methods for measuring torque of rotating machine components are discussed herein. However, embodiments of the disclosure can be employed to measure other forces applied to rotating or stationary machine components without limit.

Figure 1:
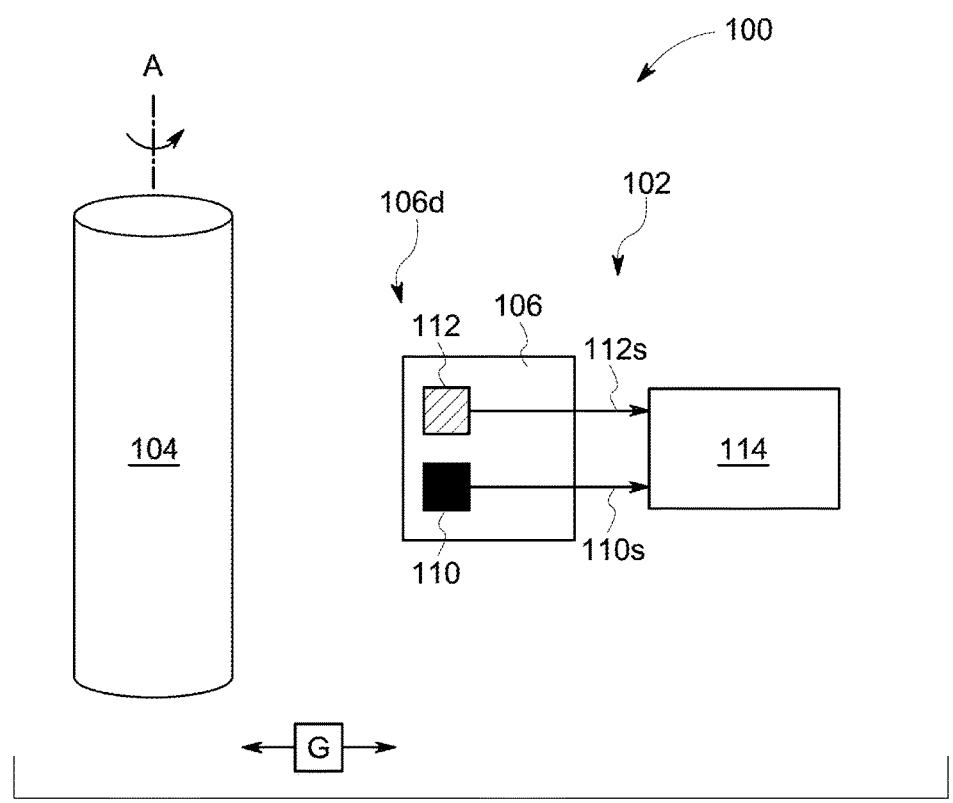
FIG. 1 is a diagram illustrating one exemplary embodiment of an operating environment including a magnetostrictive torque sensor having a sensor head including a torque sensor and a temperature sensor.

FIG. 1 illustrates one exemplary embodiment of an operating environment 100 containing a temperature compensated torque sensor 102 and a target 104. The temperature compensated torque sensor 102 can be a magnetostrictive torque sensor including a sensor head 106, a torque sensor 110, a temperature sensor 112, and a controller 114. The torque sensor 110 can be positioned within the sensor head 106 and it can be configured to generate first signals 110s representative of torque applied to a selected portion of the target 104. The temperature sensor 112 can be positioned on or adjacent to a distal end 106d of the sensor head 106 to facilitate thermal communication with the target 104 and it can be configured to generate second signals 112s representative of a temperature of the selected portion of the target 104.

In use, the sensor head 106 can be positioned proximate to the target 104 (e.g., separated by a gap G) for acquiring torque and temperature measurements from the target 104. The controller 114 can be configured to receive the first and second signals 110s, 112s, determine a torque applied to the selected portion of the target 104, and it can use the temperature measurements to adjust the determined torque to compensate for changes in the magnetic properties of the target 104 (e.g., magnetic permeability) caused by temperature variations within the selected portion of the target 104. In this manner, the accuracy of the torque measurements can be increased. In certain embodiments, the sensor head 106 can be coupled to a frame or other stationary fixture (not shown) to position the sensor head 106 at a desired orientation and/or position with respect to the target 104 and to maintain the gap G approximately constant. In other embodiments, the torque and temperature measurements can be acquired from the target 104 while the target 104 is rotating (e.g., about a longitudinal axis A) or while the target is stationary.

As discussed in greater detail below, certain embodiments of the temperature sensor 112 can be separate from the torque sensor 110 and mounted to the distal end 106d of the sensor head 106. In other embodiments, the temperature sensor 112 can be integrated with magnetic sensing elements of the torque sensor 110. In either case, the temperature sensor can be configured such that it substantially avoids interfering with magnetic flux sensed by the torque sensor 110. Other embodiments are within the scope of the disclosed subject matter.

Figure 2:
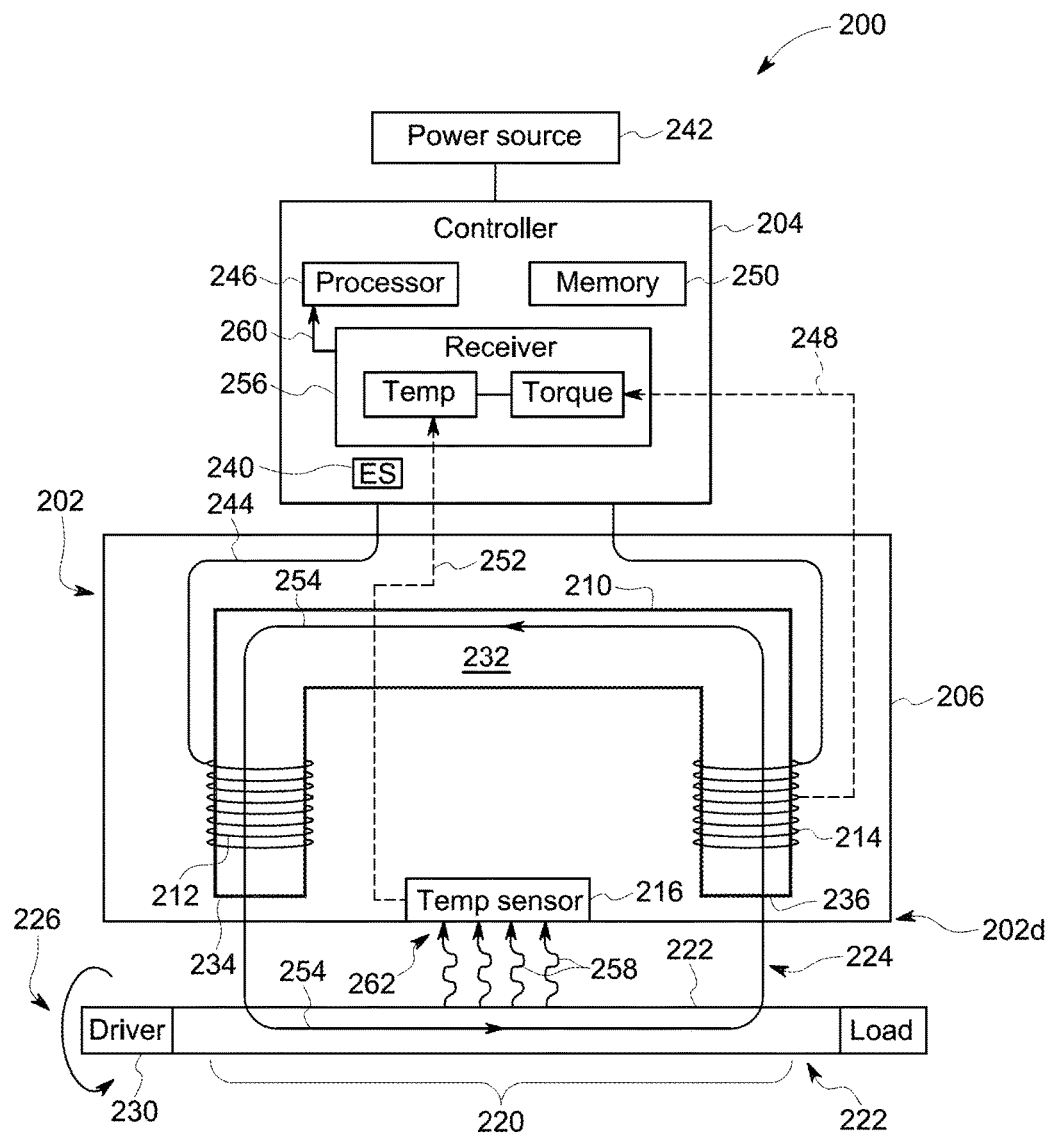
FIG. 2 is a side cross-sectional view of one exemplary embodiment of a magnetostrictive torque sensor of FIG. 1 including a sensor head having a core, a driving coil, a sensing coil, and one or more temperature sensors.

FIG. 2 is a side cross-sectional view of one exemplary embodiment of a temperature compensated torque sensing system 200 that includes a sensor head 202 in electrical communication with a controller 204. The sensor head 202 can form a housing 206 that contains a torque sensor including a core 210, a driving coil 212, and a sensing coil 214. The sensor head 202 can also include a temperature sensor 216 coupled to the sensor head 202. As discussed in greater detail below, the torque sensor can be configured to measure torque applied to a selected portion 220 of a target 222 (e.g., a portion of the target 222 positioned opposite the sensor head 202 and separated by a gap 224). The temperature sensor 216 can be configured to measure the temperature of the target 222 concurrently with the torque measurements acquired by the torque sensor.

The target 222 can be a component of any machine or equipment 226 that is configured to rotate. Examples of rotating components can include, but are not limited to, shafts and rotors. Examples of machines and equipment 226 incorporating rotating components can include, but are not limited to, turbomachines (e.g., turbine engines, compressors, pumps, and combinations thereof), generators, combustion engines, and combinations thereof. Force or load can be applied to the target 222 by a driver 230 (e.g., a reciprocating engine, a combustion engine, a turbine engine, an electrical motor, etc.) to enable the target 222 to rotate and drive a load. The target 222 can be formed from materials including, but not limited to, ferromagnetic materials such as iron, steel, nickel, cobalt, and alloys thereof. In certain embodiments, the target 222 can be non-magnetized. In other embodiments, the target 222 can be magnetized.

The core 210 can include a base 232 and at least two elongated poles 234, 236. The poles 234, 236 can extend outwards from the base 232 and they can be separated from one another by a selected distance. The core 210 can be formed from any ferromagnetic material. Examples can include, but are not limited to, iron, steel, nickel, cobalt, and alloys thereof. One of the poles 232 can be a driving pole to which the driving coil 212 is wrapped around. The other of the poles 234 can be a sensing pole to which the sensing coil 214 is wrapped around.

The driving coil 212 and the sensing coil 214 can each be in electrical communication with the controller 204. As shown in FIG. 2, the controller 204 can be electrically coupled to an excitation source ES 240 by wired or wireless connections. Wireless communication devices, such as radio frequency (RF) transmitters, can be integrated with the controller 204 to transmit the signals to an RF receiver integrated with the excitation source ES 240. As also shown in FIG. 2, the controller 204 can be positioned remotely from the sensor head 202. However, in alternative embodiments (not shown), the controller 204 can be positioned within the sensor head 202.

A power source 242 (e.g., electrical outlet, electrical generator, battery, etc.) can provide power to the controller 204 and the excitation source ES 240. The excitation source ES 240 can be configured to deliver a driving current 244 (e.g., an AC current) to the driving coil 212 and the controller 204 can be configured to control characteristics of the driving current 244 delivered to the driving coil 212 (e.g., frequency, amplitude, etc.) by the excitation source ES 240. The controller 204 can be any computing device employing a general purpose or application-specific processor 246. In either case, the controller 204 can include memory 250 for storing instructions related to characteristics of the driving current 244, such as frequency, amplitude, and combinations thereof. The memory 250 can also include instructions and algorithms for integrating sensor signals (e.g., torque signal 248 and temperature signal 252) and compensating torque measurements based on the temperature signal 252 (e.g., temperature of the target 222). The processor 246 can include one or more processing devices, and the memory 250 can include one or more tangible, non-transitory, machine-readable media collectively storing instructions executable by the processor 246 to perform the methods and control actions described herein.

The driving current 244 can pass through the driving coil 212 to generate a magnetic flux 254. The magnetic flux 254 can permeate the target 222, pass through the sensing coil 214, and return to the driving coil 212 via the core 210 (e.g., the sensing pole). In this manner, a magnetic loop can be formed through the torque sensor and the target 222.

The sensing coil 214 can be used to measure magnetic flux 254 exiting the target 222. Because force (e.g., compression, tension, torsion, etc.) applied to the target 222 can change the magnetic permeability of the target 222, the magnetic flux 254 sensed by the sensing coil 214 can change. Thus, the torque applied to the target 222 can be determined based on the change in magnetic flux 254 received by the sensing coil 214 relative to the magnetic flux 254 generated by the driving coil 212. The sensing coil 214 can be configured to transmit torque signal 248 indicative of the changes (e.g., difference) in the magnetic flux 254 to the controller 204.

The torque signal 248 can be communicated by wired or wireless connections to the controller 204 (e.g., receiver 256). As an example, wireless communication devices, such as RF transmitters, can be integrated with the sensor head 202 (e.g., proximate to the sensing coil 214) to transmit the signals to an RF receiver integrated with the controller 204. The receiver 256 can include electronic components (e.g., amplifiers, filters, etc.) that can condition the torque signal 248 before transmitting the torque signal 248 to the processor 246. In other embodiments, the torque signal 248 can be conditioned after being processed by the processor 246.

Upon receipt of the torque signal 248 from the sensing coil 214, the processor 246 can process the torque signal 248 to calculate the torque applied to the target 222. That is, the processor 246 can execute pre-stored and/or user-defined algorithms in the memory 250 to calculate the magnitude of the torque applied to the target 222 based on the characteristics of the target 222, the sensor head 202, and the driving current 244.

As discussed above, the temperature of the target 222 (e.g., temperature at about its outer surface) can affect its magnetic permeability and can in turn affect the torque measurements. Thus, torque measurements determined for the target 222 based upon the magnetic flux 254 sensed by the torque sensor can deviate from the actual torque applied to the target 222. To address this issue, the temperature of the target 222 (e.g., heat 258 radiated from the target) can be measured and used to adjust the torque measurements to account for variations in the magnetic properties of the target 222 due to temperature changes. In this manner, the temperature sensor 216 can improve the accuracy of the torque measurements and enable better control of the machine or equipment 226 incorporating the target 222.

The position of the temperature sensor 216 relative to the target 222 can be selected to facilitate both the torque measurements acquired by the torque sensor and the temperature measurements acquired by the temperature sensor 216. If the temperature sensor 216 is positioned too close to the target 222, magnetic flux 254 generated by driving coil 212 can interact with the temperature sensor 216 to a degree that perturbs magnetic flux 254 sensed by the sensing coil 214. Alternatively, if the temperature sensor 216 is positioned too far from the target 222, a large thermal gradient can be established between the target 222 and the temperature sensor 216 and temperatures measured by the temperature sensor 216 can deviate significantly from the actual temperature of the target 222.

To address one or both of these considerations, the temperature sensor 216 can be positioned at a location within a magnetic neutral region 262 of the sensor head 202 that exhibits a relatively low temperature gradient between the temperature sensor 216 and the target 222 (e.g., a temperature gradient less than a threshold value). The magnetic neutral region 262 can be any region of the sensor head 202 that exhibits a magnetic permeability less than the poles 234, 236 and the target 222 and that does not directly contact the target 222. That is, a greater fraction of the magnetic flux 254 can be present outside the magnetic neutral region 262 than within the magnetic neutral region 262, decreasing the likelihood of undesirable perturbation of the magnetic flux 254. The magnetic neutral region 262 can be located between the driving pole 312 and the sensing pole 314. The temperature gradient between the temperature sensor 216 and the target 222 can be reduced by positioning the temperature sensor 216 as close as possible to the target 222, within the boundaries of the magnetic neutral region 262. As shown in FIG. 2, the temperature sensor 216 can be positioned on a distal end 202d of the sensor head 202.

The temperature sensor 216 can be a non-contact sensor that is configured for thermal communication with the target 222 and measurement of its temperature without direct contact. Examples of temperature sensors 216 can include, but are not limited to, thermoelectric temperature sensors (e.g., thermocouples), pyroelectric temperature sensors, piezoelectric temperature sensors, thermistors (e.g., Pt100), and zick-zack filament wire. In the case of thermoelectric temperature sensors, pyroelectric temperature sensors, and piezoelectric temperature sensors, electrical voltage over the temperature sensor 216 can be dependent upon temperature. In the case of thermistor and zick-zack filament wire, electrical resistance of the temperature sensor 216 can be dependent upon its temperature. The temperature sensor 216 can also include voltage or current sensing circuitry configured to output the temperature signal 248 (e.g., a voltage signal or a current signal) to the controller 204 for processing.

The temperature signal 252 can be combined with the torque signal 248 in the receiver 256, thereby generating a combined signal 260. The receiver 256 can include electronic components (e.g., amplifiers, filters, etc.) that can condition the temperature signal 252 before transmitting the temperature signal 252 to the processor 246. In other embodiments, the temperature signal 252 can be conditioned after being processed by the processor 246. Similar to the torque signal 248 from the sensing coil 214, the temperature signal 252 can also be conditioned with electronic components, such as amplifiers, filters, or the like, before or after combining with the torque signal 248 or processed by the processor 246. Additionally, in certain embodiments, the signals 248, 252 can be combined in the processor 246, rather than in the receiver 256. The memory 250 can include instructions and algorithms executable by the processor 246 to combine the signals 248, 252 and compensate the measured torque based on the measured temperature (e.g., the temperature signal 252). The temperature signal 252 may be communicated by wired or wireless connections to the controller 204, as discussed above with respect to the torque signal 248.

Figure 3:
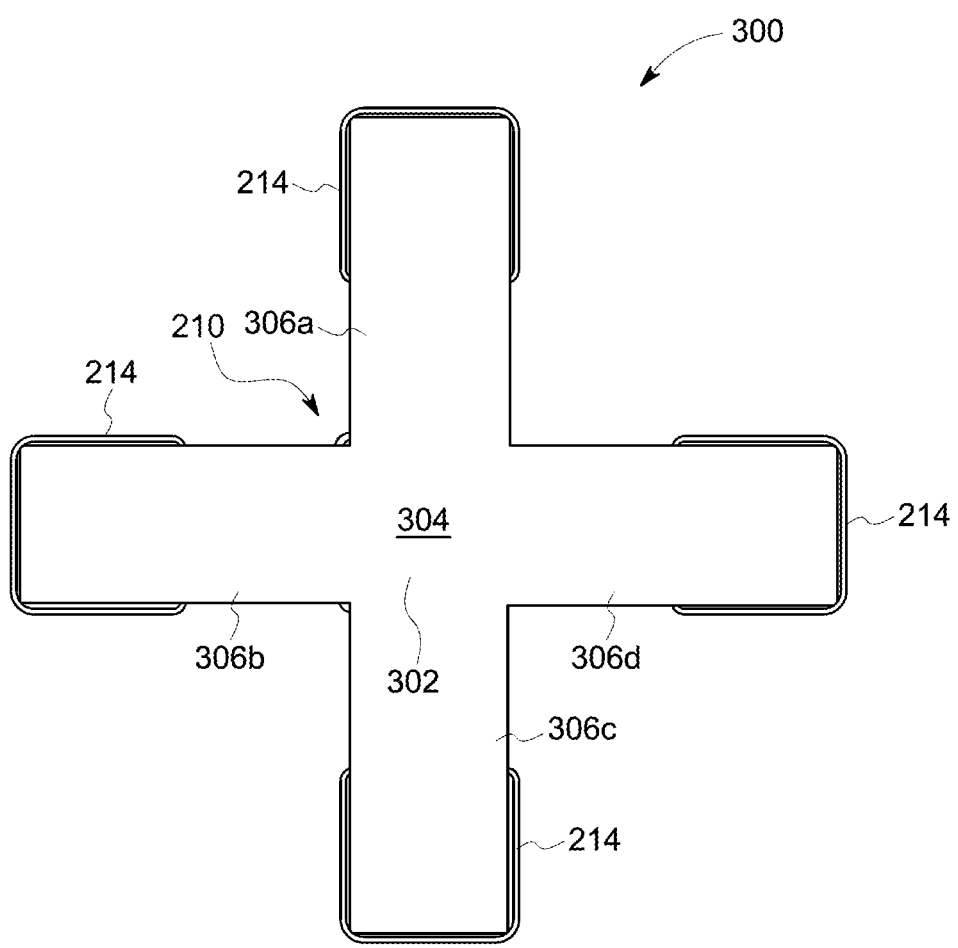
FIG. 3 is a top view of an exemplary embodiment of a core of the magnetostrictive torque sensor of FIG. 2.

FIG. 3 is a top view of an exemplary embodiment of a torque sensor including a core 300 having a cross axis yoke 302 with a cross yoke portion 304. Four bases 306a, 306b, 306c, 306d of the cross axis yoke 302 can extend radially outward in a plane from the cross yoke portion 304. The four bases 306a, 306b, 306c, 306d can be substantially orthogonal to each other around the cross yoke portion 304. Each of the four bases 306a, 306b, 306c, 306d can extend from the cross yoke portion 304 in any configuration and for any length that enables each to operate as described herein. In some embodiments, the cross axis yoke 302 can have any number of members, such as 1, 2, 3, 4, 5, 6, 7, 8, 9, 10, or more extending radially from the cross yoke portion 304. The bases 306a, 306b, 306c, 306d can be angularly spaced apart by an angle ranging from about 10 degrees to 135 degrees (e.g., 10 degrees, 20 degrees, 30 degrees, 40 degrees, 45 degrees, 60 degrees, 75 degrees, 90 degrees, 120 degrees, 135 degrees, or any combination thereof). As shown in FIG. 3, the bases 306a, 306b, 306c, 306d can be angularly spaced apart by approximately 90 degrees. Additional embodiments of the sensor head 300 and the torque sensor are discussed in U.S. Pat. No. 9,618,408, the entirety of which is hereby incorporated by reference.

Figure 4A:
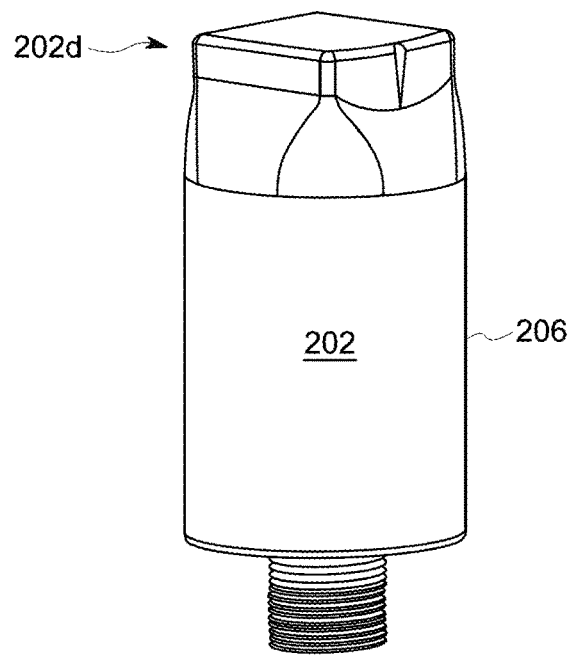
FIG. 4A is a perspective view of an exemplary embodiment of a housing of the sensor head of FIG. 2.
Figure 4B:
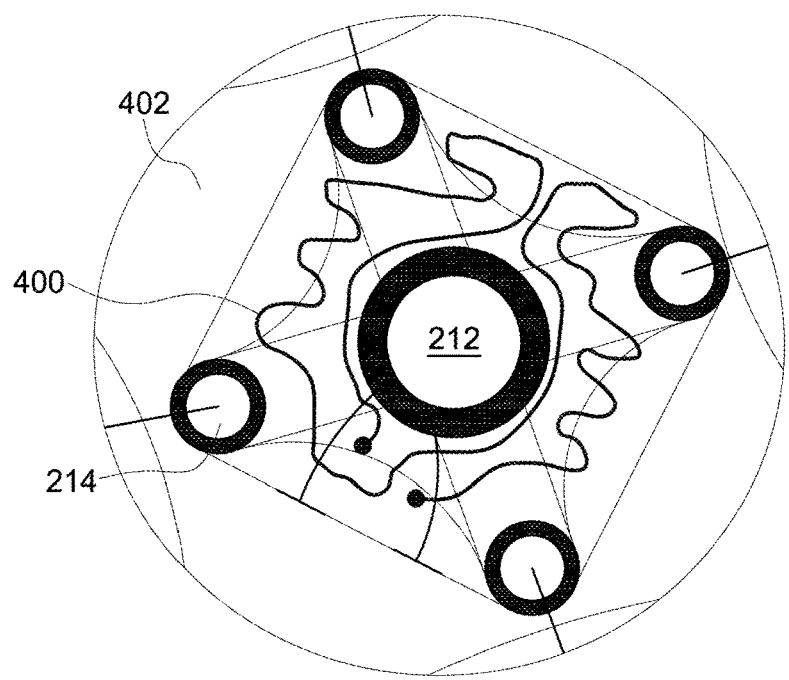
FIG. 4B is a transparent top view of a distal end of the housing of FIG. 4A illustrating temperature sensors mounted to an interior face of the distal end of the sensor head.
Figure 4C:
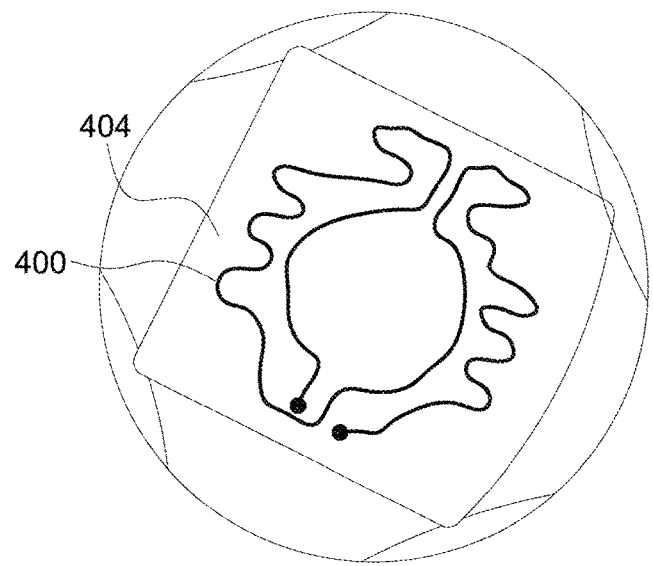
FIG. 4C is a top view of the distal end of the housing of FIG. 4A illustrating temperature sensors mounted to an exterior face of the distal end of the sensor head.

FIGS. 4A-4C illustrate the sensor head 202 including another exemplary embodiment of a temperature sensor 400. As shown in FIG. 4A, the distal end 202d of the sensor head 202 can be substantially planar and the temperature sensor 400 can take the form of a resistance temperature detector (RTD). The RTD can be an electrically conductive wire (e.g., platinum, copper, etc.) extending within a plane defined by the distal end 202d of the sensor head 202 and it can be configured to output a temperature signal based upon its temperature (e.g., heat received from the target).

Figure 4D:
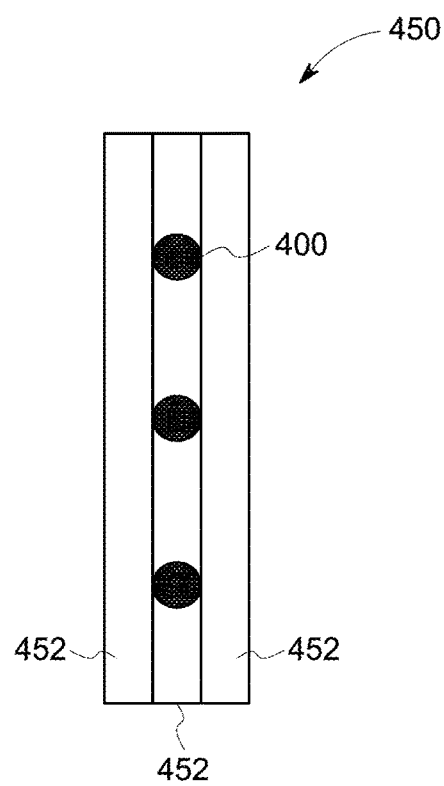
FIG. 4D is a side cross-sectional view of another exemplary embodiment of the housing of FIG. 4A having a laminated structure and illustrating a temperature sensor embedded between layers of the laminated structure.

The RTD temperature sensor 400 can be mounted to the sensor head 202 in a variety of configurations. In one embodiment, the RTD temperature sensor 400 can be coupled to an inner face 402 of the distal end 202d of the sensor head 202 (FIG. 4B). In another embodiment, the RTD temperature sensor 400 can be coupled to an outer face 404 of the distal end 202d of the sensor head 202 (FIG. 4C). In an additional embodiment, illustrated in FIG. 4D, the distal end 202d of the sensor head 202 can be formed as a laminate 450 having two or more layers and the RTD temperature sensor 400 can be positioned between adjacent layers. In certain embodiments, the RTD temperature sensor 400 can be embedded within one or more of the layers. In either case, the shape of the RTD temperature sensor 400 can be open-sided (e.g., the free ends of the RTD are not electrically connected). As also shown in FIGS. 4B-4C, the path of the RTD temperature sensor 400 can avoid overlying either the driving coil or the sensing coils. That is to say, the RTD can be positioned within the magnetically neutral region. In this manner, the RTD temperature sensor 400 can substantially avoid perturbation of magnetic flux sensed by the torque sensor. Furthermore, since the RTD temperature sensor 400 can be positioned on or within the distal end of the sensor head 300, heat radiated from the target can be accurately measured by the RTD temperature sensor 400 when the sensor head 202 is positioned proximate to the target 222.

Figure 5:
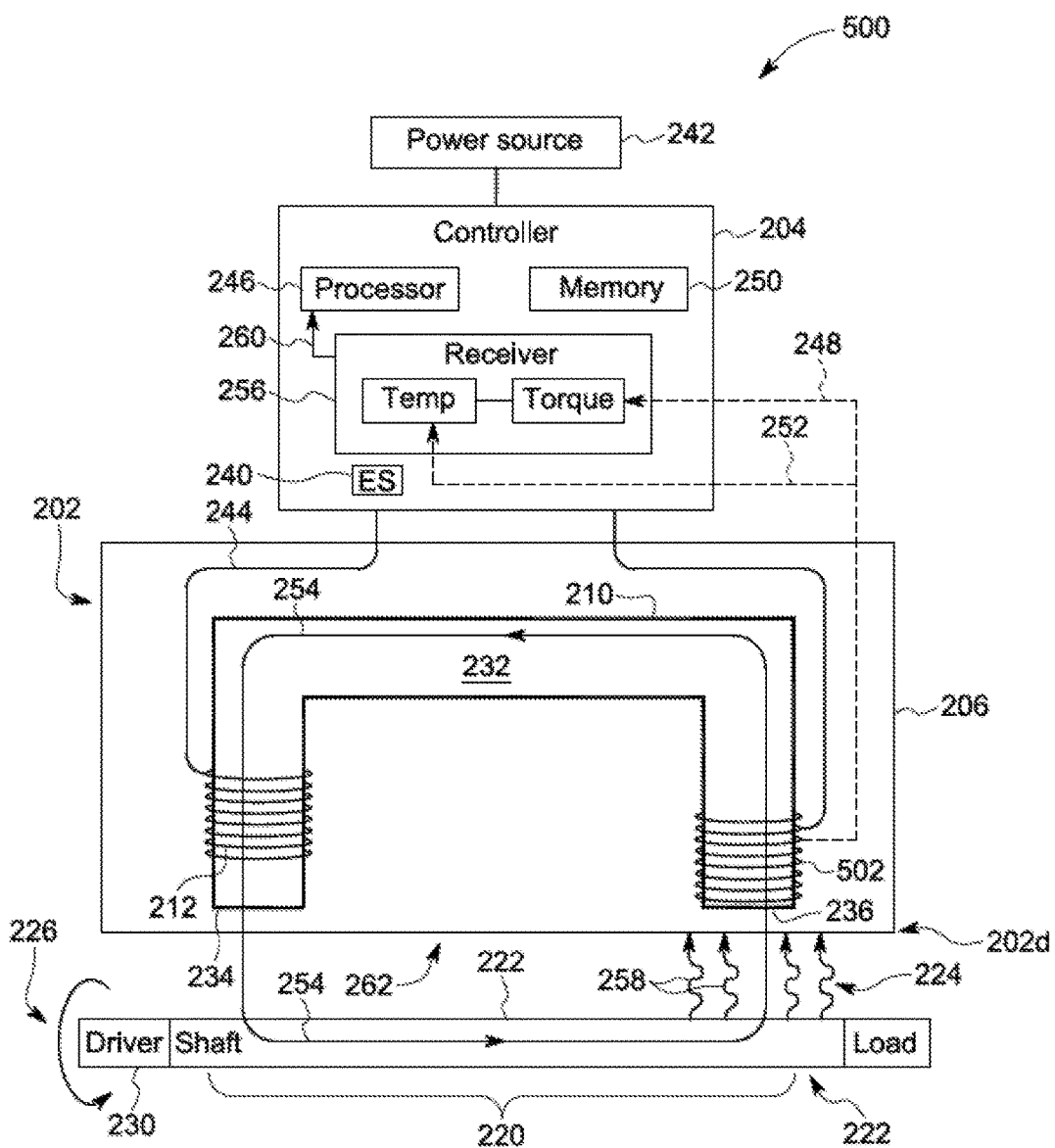
FIG. 5 is a side cross-sectional view of another exemplary embodiment of a magnetostrictive torque sensor of including a sensor head having a core, a driving coil, and a sensing coil configured to measure a target temperature.

FIG. 5 is a side cross-sectional view illustrating another exemplary embodiment of a temperature compensated torque sensing system 500. The temperature compensated torque sensing system 500 can be similar to the temperature compensated torque sensing system 200 of FIG. 2 except that it can include a sensing coil 502 that is configured to measure both the torque applied to the target as well as the temperature of the target. At least a portion of the sensing coil 502 can remain wrapped around the sensing pole 236; however its position on the sensing pole 236 can be distally advanced. As shown in FIG. 5, a distal end of the sensing coil 502 can be positioned at about a free end (e.g., a distal-most end) of the sensing pole 236. In another embodiment, not shown, the distal end of the sensing coil can be positioned distally beyond the free end of the sensing pole 236. In either position, the sensing coil 214 can be in thermal communication with the target 222 and its temperature can be approximately equal to the target temperature when the sensor head 202 is positioned adjacent to the target 222.

Figure 6:
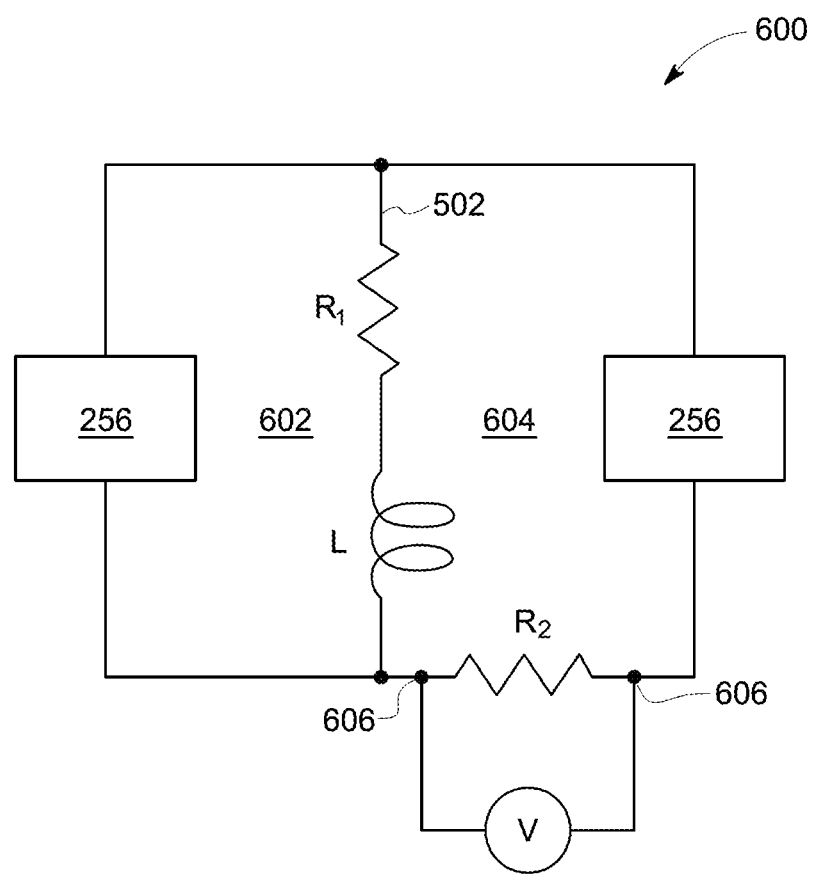
FIG. 6 is a diagram illustrating one exemplary embodiment of an electrical circuit including a torque sensing portion and a temperature sensing portion.

FIG. 6 is a schematic diagram illustrating an exemplary electrical circuit 600 of the temperature compensated torque sensing system 500. The electrical circuit 600 can include a torque sensing circuit 602 and a temperature sensing circuit 604. The torque sensing circuit 602 can include the receiver 256 and the sensing coil 502, where the latter can be represented by resistor $R_1$ and inductor L. The temperature sensing circuit 604 can include the receiver 256, the sensing coil 502, an additional drive V, and a resistor $R_2$ interposed between nodes 606 of the drive V.

The sensor coil 502 can also be formed from a material having an electrical resistance that is dependent upon temperature. The torque sensing circuit 602 can operate as discussed above with respect to FIG. 2, where the sensing coil can sense magnetic flux 254 and output the torque signal 248 (e.g., a first alternating current) to the receiver 256. The drive V can provide either a direct current DC or a second alternating current AC for measuring resistance of the sensing coil 502. This measured resistance can be the temperature signal 252 and it can be transmitted to the receiver 256. The processor 246 can condition and combine the torque signal 248 and temperature signal 252 to compensate the torque measurement based at least in part on effects of temperature variations on the magnetic permeability of the target 222. Similar to the temperature compensated torque sensing system 200, the torque measurements generated by the temperature compensated torque sensing system 500 can be more accurate compared to torque sensing systems that do not have an integrated temperature sensor.

The electrical circuit 600 can be configured to avoid interference between the torque signal 248 and the temperature signal 252. In the circumstance where direct current DC is provided by the drive V, a portion of the torque sensing circuit 602 (e.g., the receiver 256) can be configured to filter this direct current DC so that it does not interfere with the torque signal 248. Similarly, in the circumstance where the second alternating current AC is provided by the drive V, the frequency of the second alternating current can be less than the first alternating current of the torque signal 248. As a result, the second alternating current can be substantially independent of the inductance of the sensing coil 502. That is, the second alternating current can substantially avoid interfering with magnetic flux 254 sensed by the sensing coil 502.

The embodiment of FIG. 6 illustrates the circumstance where measuring the resistance of the sensing coil is voltage driven with voltage measured. However, other combinations are possible, such as current driven with current being measured.

Figure 7:
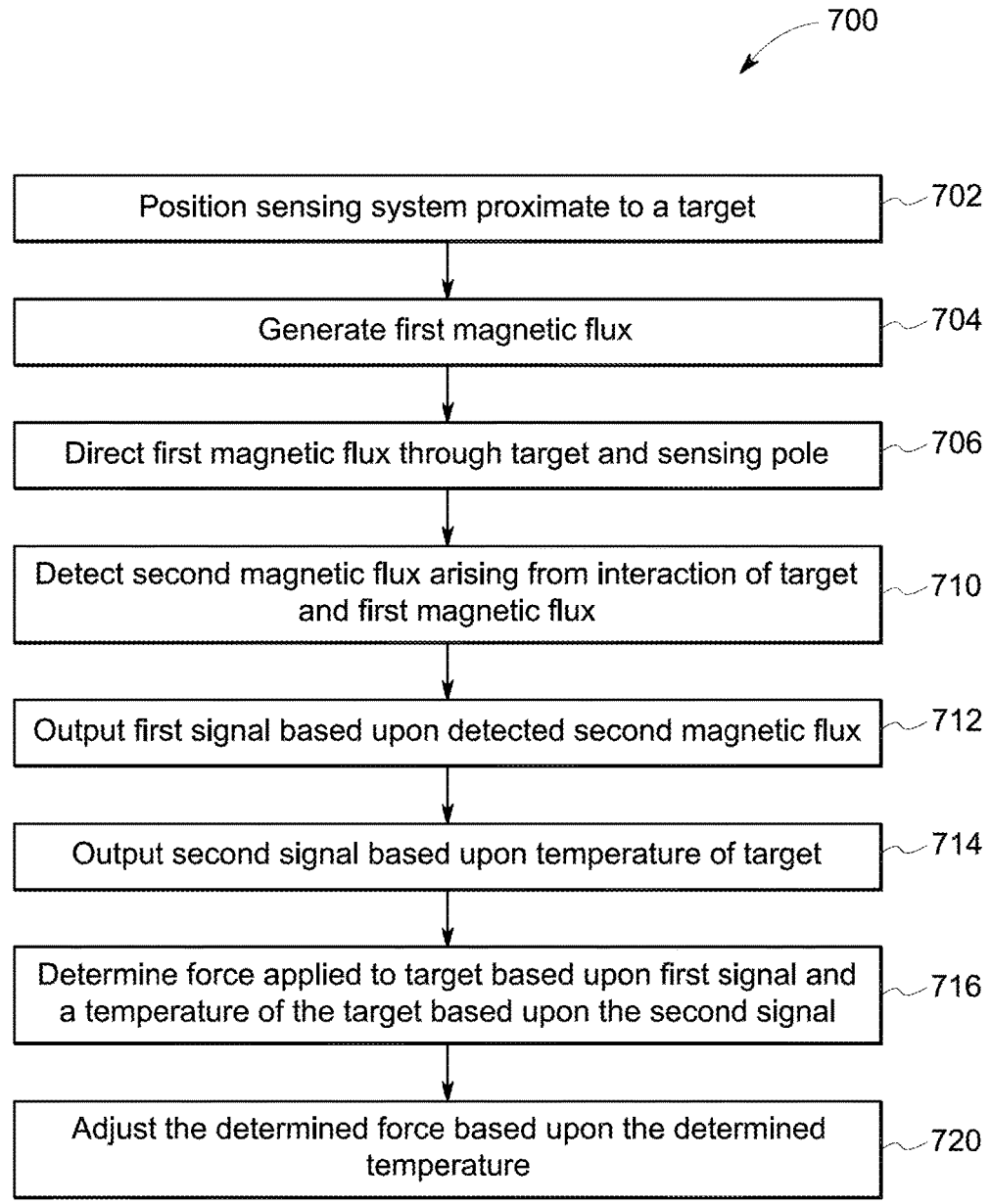
FIG. 7 is a flow diagram illustrating an exemplary embodiment of a method for measuring torque and temperature of a target.

FIG. 7 is a flow diagram illustrating an exemplary embodiment of a method 700 for measuring force (e.g., torque) and temperature of a target using any of the sensing systems discussed herein. The method 700 is described below in connection with the temperature compensated torque sensing system 200 of FIG. 2. However, the method 700 is not limited to use with the temperature compensated torque sensing system 200 and it can be employed with any magnetostrictive torque sensor and temperature sensor (e.g., 500). In certain aspects, embodiments of the method 700 can include greater or fewer operations than illustrated in FIG. 7 and can be performed in a different order than illustrated in FIG. 7.

As shown in FIG. 7, in operation 702, a temperature compensated torque sensing system (e.g., 200) can be positioned proximate to a target (e.g., 222). As discussed above, the temperature compensated torque sensing system 200 can include the torque sensor and the temperature sensor 216. In operation 702, the temperature compensated torque sensing system 200 can be positioned proximate to the target 222. In operations 704-706, a first magnetic flux can be generated by the torque sensor (e.g., by driving coil 212) and directed through the target 222 and the sensing pole 236. In operations 710-712, a second magnetic flux, representing a net interaction of the first magnetic flux with the target 222, can be detected by the torque sensor (e.g., sensing coil 214, 502) and a first signal (e.g., the torque signal 248) can be output by the torque sensor based upon a second magnetic flux. In operation 714, a second signal (e.g., the temperature signal 252) can be output by the temperature sensor 216 based upon a temperature of the target 222. In operation 716, a force (e.g., torque) applied to the target 222 can be determined based upon the first signal 248 and a temperature of the target 222 can be determined based upon the second signal 252. In operation 720, the determined torque can be adjusted based upon the determined temperature.

Exemplary technical effects of the methods, systems, and devices described herein include, by way of non-limiting example, temperature compensation of torque measurements. Integration of one or more temperature sensors into a force sensing system (e.g., a torque sensing system) can provide one or more of the following non-limiting technical effects, in any combination: (1) Avoiding interference between acquisition of temperature measurements and torque measurements. Separate or stand-alone temperature sensors can be provided in a metallic housing (e.g., stainless steel) that can disturb magnetic fields employed for measuring torque if positioned too close to torque sensors. (2) Improved accuracy of temperature measurements. If separate or stand-alone temperature sensors are distanced from torque sensors to avoid magnetic interference, the measured temperature can be different than if the temperature sensors are positioned closer to the torque sensor (e.g., closer to the target). (3) More accurate temperature correction of torque measurements. Acquisition of surface temperatures of a target (e.g., a shaft) more closely to the location where torque signals are measured. (4) Improved signal to noise ratio of torque and temperature sensing signals. Separate temperature and torque sensing signals brought together through interconnecting cables can pick up noise in the field. (5) Lower installation cost for one integrated sensor rather than two separate sensors. (6) Lower development and safety approval certification costs for one integrated sensor rather than two separate sensors. (7) More appealing design for end users for one integrated sensor rather than two separate sensors.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A magnetostrictive sensor comprising:
   a sensor head including,
     a driving pole having a driving coil coupled thereto that is configured to generate a first magnetic flux for impinging a target in response to receipt of a driving current;
     a sensing pole having a sensing coil coupled thereto that is configured to,
       output a first signal based at least upon a second magnetic flux resulting from interaction of the first magnetic flux with the target; and
       output a second signal based upon heat received from the target; and
   a controller in electrical communication with the sensor head and configured to:
     transmit the driving current to the driving coil;
     receive the first and second signals;
     determine a force applied to the target based upon the first signal;
     determine a temperature of the target based upon the second signal; and
     adjust the force determined from the first signal based upon the temperature determined from the second signal.

2. The magnetorestrictive sensor of claim 1, wherein the first signal does not interfere with the second signal.

3. The sensor of claim 1, wherein the sensing coil is positioned at about a free end of the sensing pole.

4. The sensor of claim 1, wherein the force is a torque.

5. The sensor of claim 1, wherein the sensing coil is in electrical communication with a first circuit configured to receive the first signal and a second circuit configured to receive the second signal.

6. The sensor of claim 5, wherein the first signal is a first alternating current and the second signal is a second alternating current having a frequency less than the first signal such that the second alternating current is substantially independent of an inductance of the sensing coil.

7. The sensor of claim 5, wherein the first signal is a first alternating current and the second signal is a direct current.

8. A magnetostrictive sensor, comprising:
   a sensor head extending between a proximal end and a distal end that contains,
     a driving pole having a driving coil coupled thereto that is configured to generate a first magnetic flux extending through the distal end of the sensor head for impinging a target in response to receipt of a driving current;
     a sensing pole having a sensing coil coupled thereto that is configured to output a first signal based at least upon a second magnetic flux resulting from interaction of the first magnetic flux with the target; and
     a temperature sensor including a continuous length of electrically conductive wire that forms an open-sided shape extending within a plane defined by the distal end of the sensor head, wherein the temperature sensor is secured to the distal end of the sensor head and is configured to output a second signal based upon heat received from the target.

9. The sensor of claim 8, wherein the temperature sensor is configured to avoid magnetically interfering with each of the driving coil and the sensing coil.

10. The sensor of claim 8, wherein the open-sided shape does not overlie either of the driving pole and the sensing pole along a longitudinal axis of the sensor head.

11. The sensor of claim 8, wherein the open-sided shape is positioned on an inner face of the distal end of the sensor head.

12. The sensor of claim 8, wherein the open-sided shape is positioned on an outer face of the distal end of the sensor head.

13. The sensor of claim 8, wherein the distal end of the sensor head is laminated and wherein the open-sided shape is positioned between layers of the laminated distal end of the sensor head.

14. The sensor of claim 8, including a controller in electrical communication with the sensor head and configured to:
   transmit the driving current to the driving coil;
   receive the first and second signals;
   determine a force applied to the target based upon the first signal;
   determine a temperature of the target based upon the second signal; and
   adjust the force determined from the first signal based upon the temperature determined from the second signal.

15. The sensor of claim 8, wherein the force is a torque.

16. A sensing method, comprising:
   generating a first magnetic flux with a driving coil coupled to a driving pole of a magnetostrictive sensor;
   directing the first magnetic flux through a ferromagnetic target and a sensing pole of the magnetostrictive sensor;
   detecting, by a sensing coil coupled to the sensing pole of the magnetostrictive sensor, a second magnetic flux resulting from interaction of the first magnetic flux with the target;
   outputting, by the sensing coil, a first signal based at least upon a second magnetic flux resulting from interaction of the first magnetic flux with the target;
   outputting, by the sensing coil, a second signal based upon heat received from the target;
   determining a force applied to the target based upon the first signal;
   determining a temperature of the target based upon the second signal; and
   adjusting the force determined from the first signal based upon the temperature determined from the second signal.

17. The method of claim 16, wherein the target is rotating and the first signal represents a torque applied to the target.

18. The method of claim 17, wherein the torque represented by the first signal and the temperature represented by the second signal are detected approximately concurrently and at about a same region of the target.

19. The method of claim 16, wherein the sensing coil is distanced from the target.

20. The method of claim 19, wherein the sensing coil is positioned at about a free end of the sensing pole.

* * * * *